(12) United States Patent
Tiwari et al.

(10) Patent No.: US 12,078,058 B2
(45) Date of Patent: Sep. 3, 2024

(54) NEAR FIELD ULTRASONIC LOGGING

(71) Applicant: Weatherford Technology Holdings, LLC, Houston, TX (US)

(72) Inventors: Kunal K. Tiwari, Fulshear, TX (US); Jess V. Ford, Conroe, TX (US); Brian A. Mohon, Spring, TX (US); Mohand Arezki Belloul, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 288 days.

(21) Appl. No.: 17/659,982

(22) Filed: Apr. 20, 2022

(65) Prior Publication Data

US 2023/0340873 A1 Oct. 26, 2023

(51) Int. Cl.
| | |
|---|---|
| *E21B 47/16* | (2006.01) |
| *G01B 17/02* | (2006.01) |
| *G01N 29/04* | (2006.01) |
| *G01N 29/11* | (2006.01) |
| *G01V 1/00* | (2024.01) |
| *G01V 1/44* | (2006.01) |
| *G01V 1/52* | (2006.01) |

(52) U.S. Cl.
CPC .............. *E21B 47/16* (2013.01); *G01B 17/02* (2013.01); *G01N 29/045* (2013.01); *G01N 29/11* (2013.01); *G01V 1/001* (2013.01); *G01V 1/44* (2013.01); *G01V 1/52* (2013.01)

(58) Field of Classification Search
CPC .......... E21B 47/16; G01V 1/44; G01V 1/001; G01N 29/11; G01N 29/045; G01N 2291/0238; G01B 17/02
USPC .......................................................... 73/584
See application file for complete search history.

(56) References Cited

U.S. PATENT DOCUMENTS

| | | | | |
|---|---|---|---|---|
| 4,984,652 A | * | 1/1991 | Batzle ...................... | G01V 1/52 367/75 |
| 6,938,458 B2 | * | 9/2005 | Han ...................... | E21B 47/107 73/19.09 |

(Continued)

FOREIGN PATENT DOCUMENTS

| | | | | |
|---|---|---|---|---|
| CA | 2517658 A1 | * | 3/2006 | ......... E21B 47/0005 |
| CN | 104790939 A | * | 7/2015 | |

(Continued)

OTHER PUBLICATIONS

International Search Report and Written Opinion regarding corresponding PCT Application No. PCT/US2023/064279, mailed Jun. 21, 2023.

(Continued)

*Primary Examiner* — Stephanie E Bloss
*Assistant Examiner* — Kevin C Butler
(74) *Attorney, Agent, or Firm* — Lewis & Reese, PLLC

(57) ABSTRACT

Methods and systems for logging a wellbore having a casing using ultrasonic logging are described. Traditional ultrasonic logging involves using a piezoelectric transducer that is spaced from the inner surface of the casing by a least a distance referred to as the "far-field" distance. Logging in the "far-field," as traditionally done, avoids destructive interference. The methods and systems described herein allow logging in the "near-field." Logging in the near-field using the described methods and systems overcomes several difficulties associated with acoustic logging, particularly in attenuative, dispersive, and deviated environments.

18 Claims, 5 Drawing Sheets

(56) References Cited

U.S. PATENT DOCUMENTS

| | | | | |
|---|---|---|---|---|
| 8,824,240 | B2* | 9/2014 | Roberts | G01V 1/44 181/105 |
| 10,174,604 | B2* | 1/2019 | Tello | E21B 17/1078 |
| 2004/0095847 | A1* | 5/2004 | Hassan | G01H 5/00 367/25 |
| 2006/0067162 | A1* | 3/2006 | Blankinship | G01V 1/44 367/35 |
| 2006/0262643 | A1* | 11/2006 | Blankinship | G01V 1/44 367/25 |
| 2017/0168184 | A1* | 6/2017 | Le Calvez | G01V 1/40 |
| 2017/0342817 | A1* | 11/2017 | Tello | G01V 1/50 |
| 2019/0025450 | A1* | 1/2019 | Teague | G01V 5/04 |
| 2019/0025455 | A1* | 1/2019 | Teague | G01V 5/04 |
| 2023/0110473 | A1* | 4/2023 | Liu | E21B 47/00 367/86 |
| 2023/0340873 | A1* | 10/2023 | Tiwari | E21B 47/16 |

FOREIGN PATENT DOCUMENTS

| | | | | |
|---|---|---|---|---|
| WO | WO-2013096565 A1 * | 6/2013 | | E21B 47/00 |
| WO | WO-2018176024 A1 * | 9/2018 | | E21B 43/164 |
| WO | WO-2023205554 A1 * | 10/2023 | | E21B 47/005 |

OTHER PUBLICATIONS

Schlumberger: "UBI," Dec. 31, 2002, 12 pages, retrieved from the internet: URL <https://www.slb.com/-/media/files/fe/brochure/ubi-br.ashx>.

"Cement Bond Quality Evaluated in 9⅝-in Casing with Highly Attenuative Heavy Mud," Case Study—Schlumberger, 2016, 2 pages.

Mandal, Batakrishna, "Well Integrity Assurance Through Heavy Borehole Fluid and Thick. Casing: A Challenge of Ultrasonic Evaluation," SPWLA 57$^{th}$ Annual Logging Symposium, Jun. 26-29, 2016, 12 pages.

Molz, Eric, et al., "Ultrasonic Velocity and Attenuation Measurements in High Density Drilling Muds," SPWLA 39$^{th}$ Annual Logging Symposium, May 26-29, 1998, 19 pages.

"Ultrasonic Testing of Materials at Level 2—Training Manual for Non-Destructive Testing Techniques," Issued by the International Atomic Energy Agency, Vienna, 1988, 278 pages, IAEA-TECDOC-462.

"Ultrasonic Transducer Technical Notes," Olympus Corporation, 2011, 11 pages.

\* cited by examiner

NEAR FIELD ULTRASONIC LOGGING

FIELD OF THE INVENTION

The present application relates to wellbore logging, and more particularly to logging wellbores containing a cemented casing.

BACKGROUND

FIGS. 1 and 2 illustrate a wellbore 100 extending into the earth 102. For example, the wellbore may be a natural gas well or an oil well. FIG. 1 is a cross section view and FIG. 2 is a view from the top, as if you were standing at the edge of the wellbore looking into it. Drilling the wellbore 100 creates a face 101, which is a boundary between the wellbore and the earth 102. The wellbore also includes a casing 103, which is typically a metal tubular structure. The ring-shaped space between the face 101 and the casing 103, is referred to as an annulus and is denoted as numeral 104. It is important to note that, the wellbore 100 may include deviated or horizontal sections even though the wellbore is illustrated as only a vertical section. Distance along the wellbore from the surface is referred to herein as depth, even in horizontal sections.

It is common practice in the art to cement the casing 103 into the wellbore 100 by filling the annulus 104 with cement. This serves several purposes. It provides stability to the casing. It also prevents fluid communication between formations or reservoirs at different depths within the wellbore. For example, assume that formation 105 is a hydrocarbon-producing formation, like the Barnett Shale formation in Texas, which produces natural gas. Further assume that formation 106 is an aquifer (i.e., a formation containing water). If the annulus 104 were left empty, then it would provide fluid communication between formations 105 and 106. Water from the aquifer 106 would damage the valuable gas-producing formation 105 and gas from formation 105 would contaminate the aquifer 106.

If the cement in the annulus 104 is to serve its purpose of preventing cross-contamination between various formations and reservoirs, it is important that the cement be free of any paths, such as spaces, cracks or fissures that could provide fluid communication between such formations. For example, if the cement does not bond well to the casing 103, then a space might be left between the casing and the cement that can provide a path for fluid communication between formations.

Casing integrity can also fail if the casing becomes too thin, for example, due to wear and/or corrosion. Conversely, scale or other buildup can cause the casing to thicken. It is therefore common practice to measure several parameters concerning the condition of a wellbore casing and cement. For example, it is common practice to evaluate the quality and strength of the cement and the quality of its bond with the casing. This practice is referred to as cement bond logging (CBL). Likewise, it is common to measure the thickness of the casing of a wellbore and the internal diameter of the casing, to detect thinning and to detect places where the wellbore may become constricted.

DESCRIPTION

Figure 2:
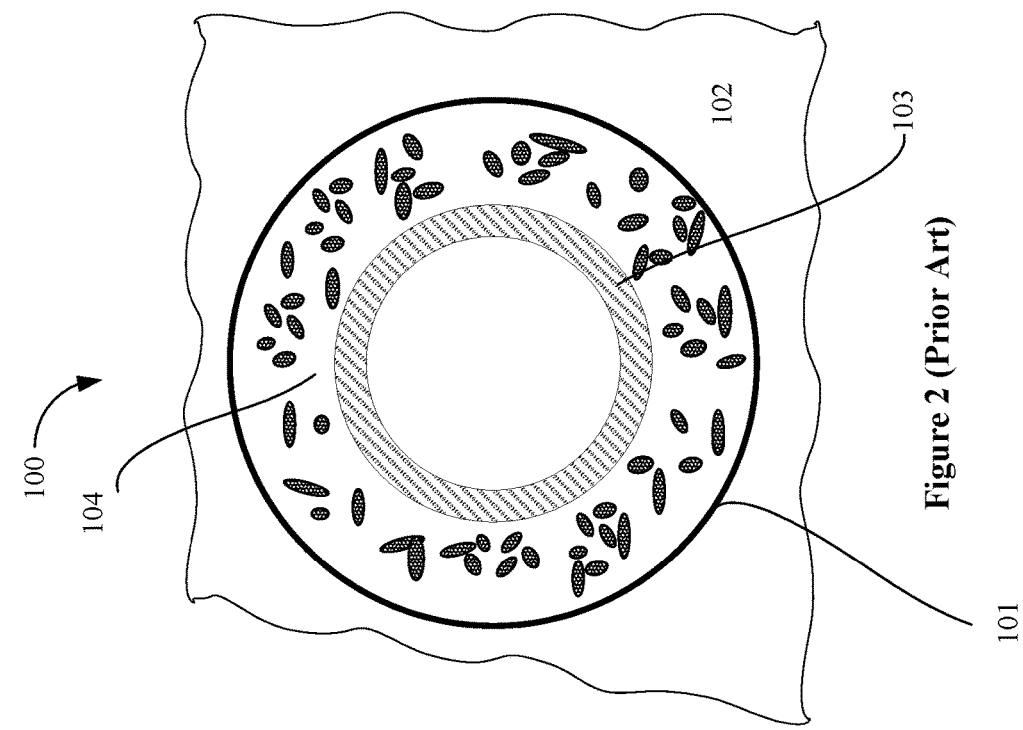
FIG. 2 shows a wellbore having a cemented casing.
Figure 1:
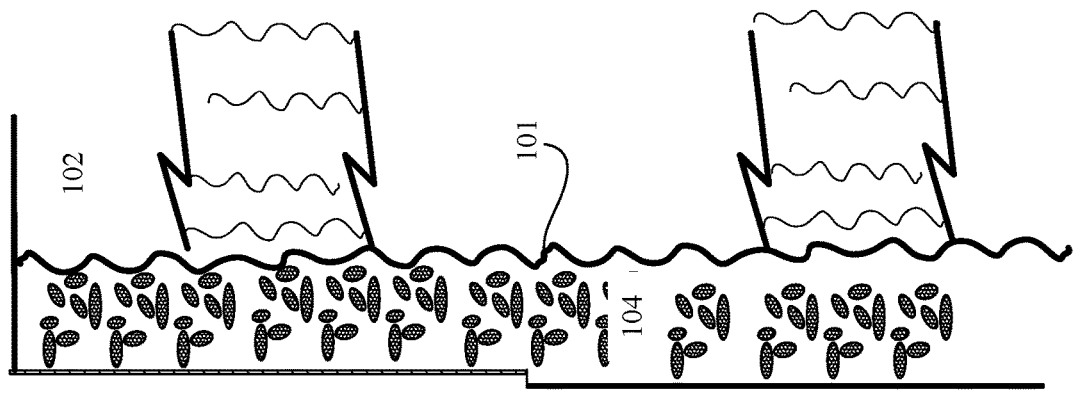
FIG. 1 shows a wellbore having a cemented casing.
Figure 1:
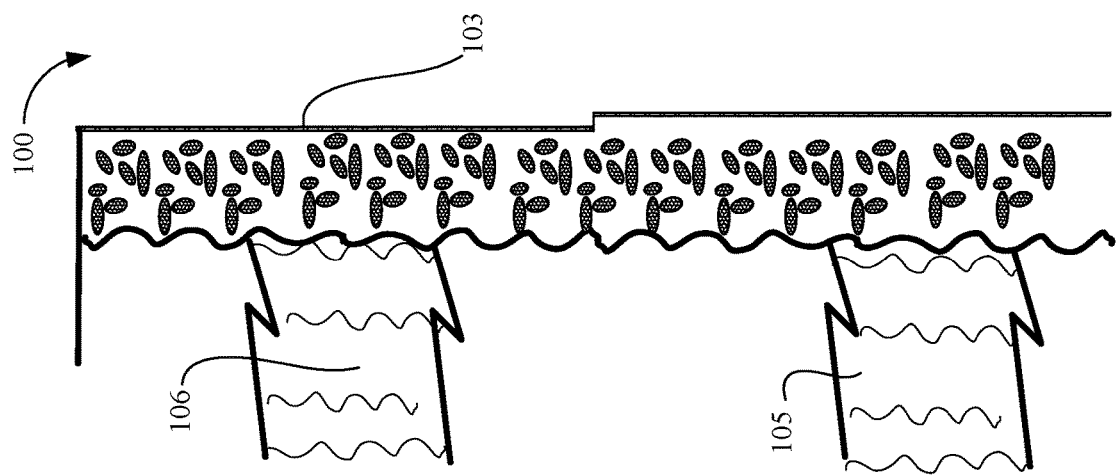
Figure 3A:
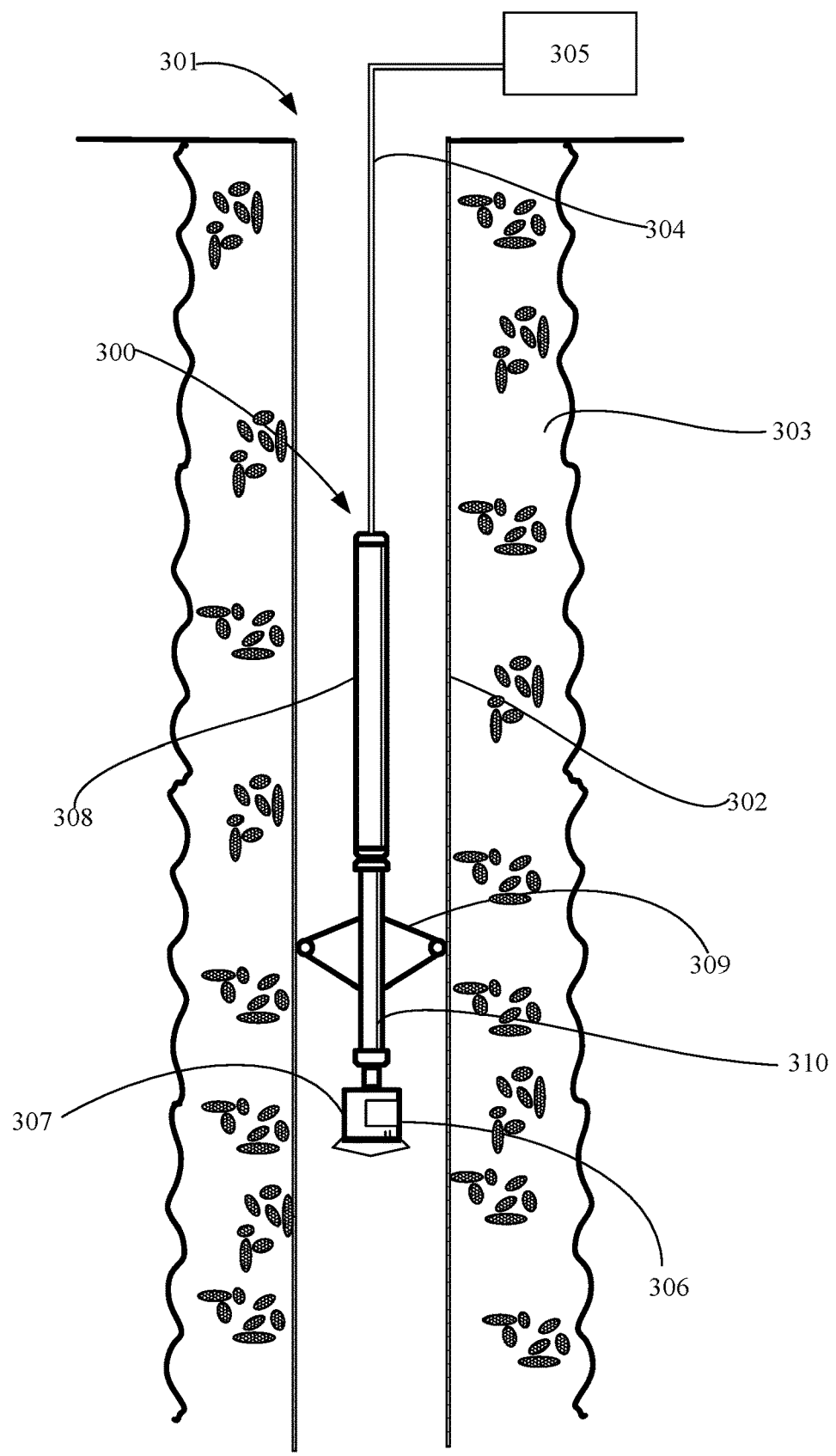
FIGS. 3A and 3B show a ultrasonic wellbore tool (UWT) for logging a wellbore having a cemented casing.

FIG. 3A shows an acoustic logging tool 300 for measuring parameters of a cased wellbore. The tool 300 uses ultrasonic energy, as described below. Such tools are therefore referred to as ultrasonic wellbore tools (UWTs), ultrasonic logging tools, or ultrasonic radial scanners. The UWT 300 may be deployed in a wellbore 301 having a casing 302 and a cemented annulus 303, as described earlier. The UWT 300 may be run into the wellbore 301 using a line 304. The line 304 supports the UWT and may also include wires for providing electrical power to the UWT and for providing data communication between the UWT and instruments 305 (such as computers, monitors, etc.) at the surface of the wellbore. A line that provides electrical and/or data communication is known as a "wireline." Alternatively, the UWT 300 may include its own power source and may store all of the programming it needs for operation and all of the measurement data it collects in memory within the UWT itself. If the UWT is self-contained, then line 304 is simply for positioning the UWT within the wellbore.

The UWT 300 includes at least one sonic or ultrasonic transducer 306. According to one such embodiment, the transducer is configured within a scanning head 307, that can be rotated about the axis of the UWT. The scanning head can include a single transducer or multiple transducers that transmit an acoustic signal toward the inside wall of the casing and that receive the return signals. The scanning head can rotate so that the entire circumference of the casing is scanned before the UWT moves to a different depth within the wellbore. A UWT including an acoustic transducer in a scanning head is described in U.S. Patent Application Publication No. 2006/0067162, published Mar. 30, 2006, the entire contents of which are incorporated herein by reference.

A UWT 300, as illustrated in FIG. 3A, generally includes a tool body 308, which may contain electronics for controlling the operation of the UWT and for either storing data that the UWT collects or telemetering that data back to instrumentation at the surface of the wellbore. Such electronics may include one or more processors programmed, or configured to be programmed with instructions for operating the UWT, for performing the calculations described below, and/or for packaging and telemetering data to the surface in an appropriate format. As used herein, the term "processing" broadly refers to analyzing or deriving information from data generated from the ultrasonic transducer(s), transmitting transducer data out of the wellbore for analysis, and/or to recording the transducer data within the tool for later analysis. Examples of suitable processors include field programmable gate arrays (FPGAs) or complex programmable logic devices (CPLDs). Specific examples include Altera and Xilinx FPGAs. Additionally, or alternatively, the UWT 300 may be controlled from the surface via wireline, as described above. Thus, one or more processors may be contained within the UWT 300 or may be provided from outside the tool, by wireline, for example.

According to some embodiments, the UWT can be centered within the wellbore using one or more centralizers 309, as is known in the art. The centralizer 309 may be integral to the UWT 300 or may be deployed as a separate modular component attached to the UWT 300, such as a centralizer sub 310.

The acoustic transducer 306 can be any type of sonic or ultrasonic transmitter known in the art, but is typically a piezoelectric (PZT) transducer. The acoustic transducer 306 can be configured to generate ultrasonic signals having a frequency within a usable range, as described in more detail below, and to receive such signals. In other words, the acoustic transducer 306 can be a transceiver, meaning that it both transmits and receives acoustic signals. Other embodiments of ultrasonic tools may be configured with separate transducers for transmitting (i.e., transmitters) and for receiving (i.e., receivers) acoustic signals. Acoustic transducers, like 306, are generally described in the U.S. Patent Application Publication No. 2006/0067162, referenced above.

Figure 3B:
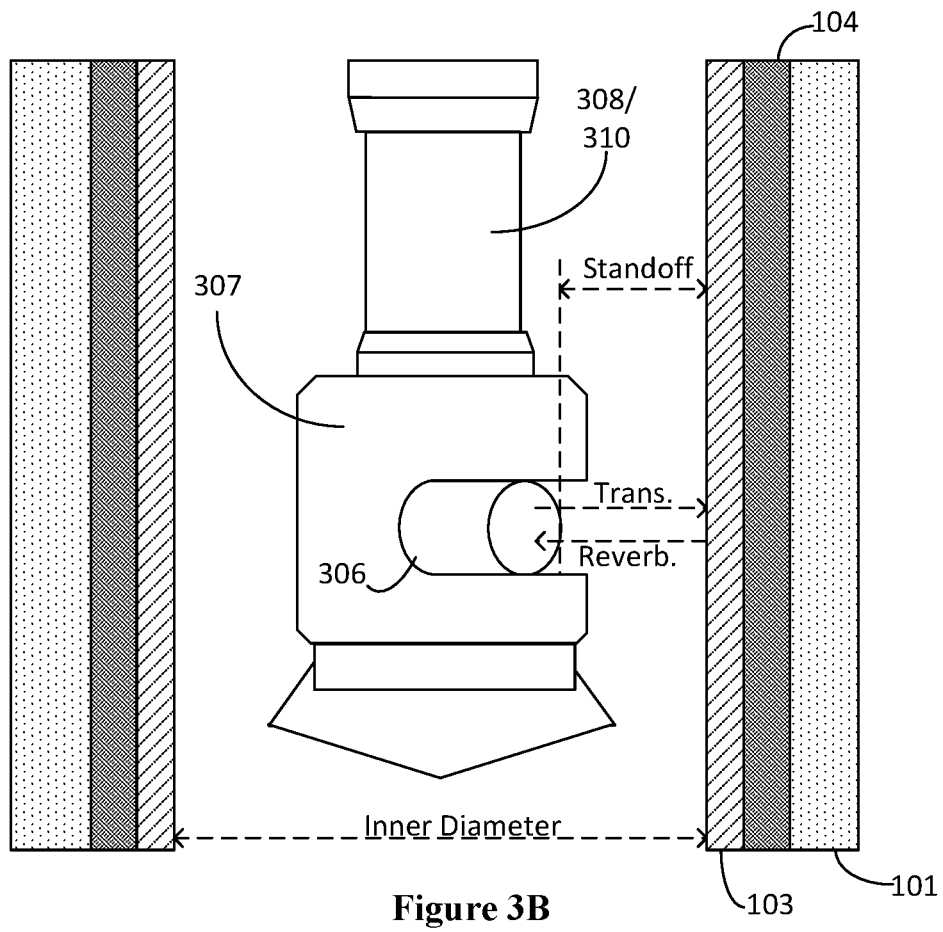

FIG. 3B shows a more detailed view of the scanning transducer head 307 attached to the tool body 308 or centralizer sub 310. As mentioned above, the scanning transducer head 307 can rotate 360° and allow the transducer 306 to fire pulses of ultrasonic energy at increments (such as 5° increments) to provide a 2D image of the casing. According to some embodiments, a variety of interchangeable transducer heads 307 may be available. For example, each of the transducer heads may have different sizes. A user may select a particular sized transducer head to provide a prescribed standoff between the transducer 306 and the inner surface of the casing 103, as described in more detail below.

Figure 4:
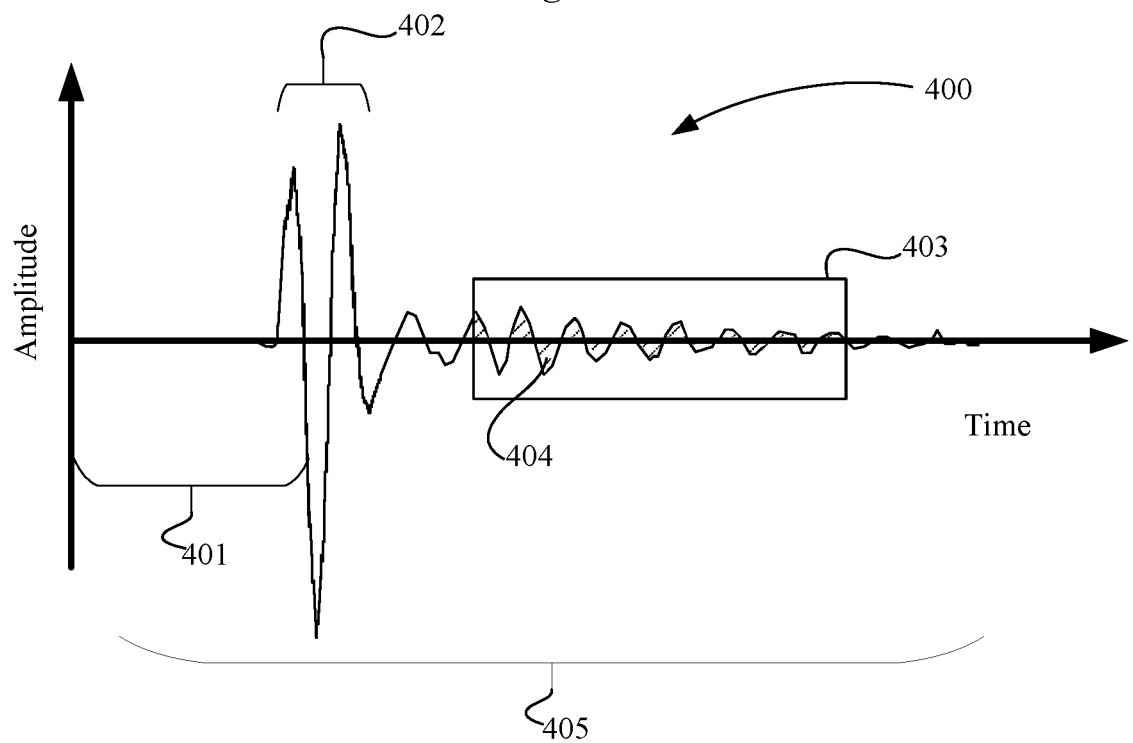
FIG. 4 shows an acoustic waveform generated by the UWT illustrated in FIG. 3.

The general principles of acoustic logging are well known in the art and will not be explained in detail here. The events that occur during an acoustic measurement are briefly described here. FIG. 4 illustrates acoustic signal received at acoustic transducer 306. During an acoustic measurement, the acoustic transducer 306 generates an acoustic signal in the form of a compressional wave. The acoustic signal should preferably have a frequency that will stimulate resonance vibration of the casing. Embodiments of the logging tools described herein feature transducer heads that can be configured to use interchangeable acoustic transducers. This allows the user to select an acoustic transducer that is capable of stimulating resonance vibrations of different sized casings. For example, the interchangeable transducers might include a low-frequency transducer, for example, having a frequency bandwidth of about 175 kHz to about 325 kHz; a medium-frequency transducer, having a frequency range of about 250 kHz to about 475 kHz; and a high-frequency transducer having a frequency range of about 350 kHz to about 625 kHz. A person of skill in the art will appreciate that other interchangeable transducers having different bandwidths are possible. A casing with a thickness of about 0.65 inches requires a resonance frequency of about 175 Hz. That value lies within the bandwidth of the low-frequency transducer mentioned above. A low-frequency transducer having a bandwidth of frequencies ranging from 175 to 325 kHz can interrogate casings having thicknesses ranging from 0.65 inches to 0.35 inches.

The transmitted acoustic signal (Trans., FIG. 3B) travels from the acoustic transducer 306 and hits the inner surface of the casing 103 causing the casing to reverberate. The reverberation signal (Reverb.) is received at the transducer. Referring to FIG. 4, the time period 401 is the time between when the transducer generates the acoustic signal when it receives the first bounce-back signal. In other words, it is the travel time from the transducer to the inside wall of the casing and back to the receiver. The casing inside diameter can be calculated based on time period 401. The frequency of the received signal during the time 403 depends on the casing thickness. Accordingly, measuring the reverberation resonance frequency provides a measurement of the actual casing thickness. The actual casing thickness may be different than the nominal casing thickness (i.e., the original thickness of the casing installed in the wellbore), for the reasons described above.

The casing reverberation attenuates (i.e., the amplitude of the reverberation decreases with time) very quickly if the casing is well cemented but not as quickly if the casing is free or only partially bonded to the cement. Measurements of the amplitude (specifically, the attenuation of the amplitude, known as "ring down") of the reverberation in area 403 of the waveform 400 is used to determine the quality of the bond between the casing and cement. The attenuation is also used to determine the compressive strength of the cement. The attenuation can be determined based on the peak amplitudes within region 403. Alternatively, the attenuation can be determined based on the integrated areas 404 under each of the peaks. The time window 405 is typically on the order of about 100 μs. The time window 403 during which attenuation is measured, is typically about 10 to about 30 μs. Typically, time window 403 is calculated to measure about four or five casing reverberations for determining attenuation.

Figure 5:
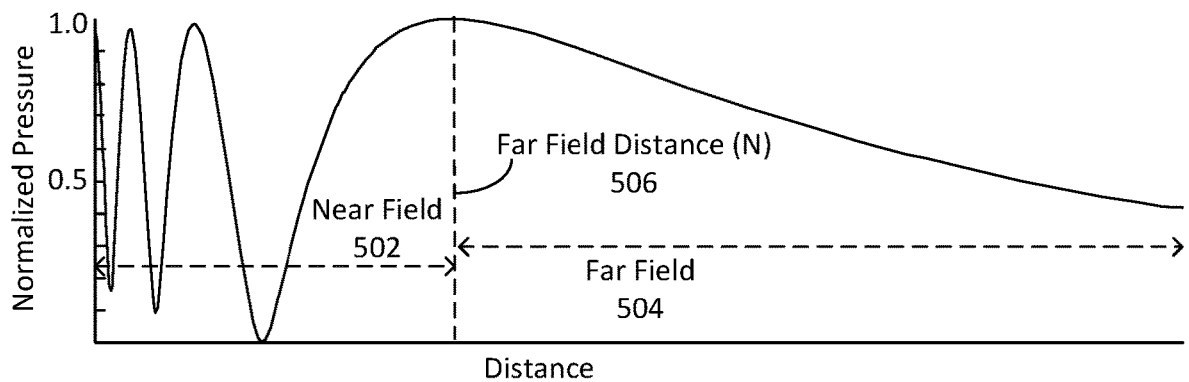
FIG. 5 shows the amplitude of an ultrasonic wave as a function of distance from a transducer.

Aspects of this disclosure relate to with how one selects an appropriate transducer head, such as transducer head 307 (FIG. 3B) to provide an appropriate standoff distance between the transducer and the inner surface of the casing. Accepted industry practice for amplitude-based ultrasonic casing inspection is logging in the so-called "far field zone" of the transducer. In other words, according to industry practice, the transducer should be far enough from the inside surface of the casing that the casing is in the "far field" zone of the radiation and not in the "near field" zone. This practice is based on classical theories of transducer behavior, which predict that the ultrasonic field distribution is uniform and relatively stable in the far field zone but that significant amplitude variation as a function of standoff distance is observed in the near field. FIG. 5 shows a graph of normalized pressure intensity (i.e., amplitude) of an acoustic beam as a function of distance from an acoustic transducer measured along the center axis of the transducer. Notice that the amplitude oscillates within the near field 502, but gradually and uniformly drops off as a function of distance within the far field 504. The non-uniform amplitude behavior in the near field is caused by destructive and constructive interference. The non-uniform behavior is why industry practice teaches to log in the far field and to avoid logging in the near field. See, e.g., Mandal, "Well Integrity Assurance Through Heavy Borehole Fluid and Thick Casing: A Challenge of Ultrasonic Evaluation," SPWLA 57$^{Th}$ Annual Logging Symposium, Jun. 25-29, 2016, and Molz, et al., "Ultrasonic Velocity and Attenuation Measurements in High Density Drilling Muds," SPWLA 39$^{th}$ Annual Logging Symposium, May 26-29, 1998.

The boundary between the near field and the far field is referred to herein as the far field distance (N) (FIG. 5, 506). The far field distance N is a function of the diameter D of the transducer crystal and the wavelength (λ) (and/or frequency (f) and velocity (v) in the medium), as shown in Equation (1):

$$N = \frac{D^2}{4\lambda} = \frac{D^2 f}{4v} \quad \text{Eq. (1)}$$

A person of skill in the art will appreciate that, for a given transducer crystal diameter and frequency, the far field distance N will be medium dependent, since different drilling muds have different slowness values (and, consequently, different values for v). For example, a 1.125 inch diameter transducer crystal operating with a frequency of 360 kHz will have a far field distance N of about 2 inches in a water-based mud having a slowness of about 205.9 μsec/ft. The same transducer will have a far field distance N of about 2.3 inches in an oil-based mud with a slowness of about 238.1 μsec/ft. It is within the ability of a person of skill in the art to determine a far field distance N for a particular transducer and a particular mud system.

Although far-field logging is the industry practice, there are challenges in performing casing inspection in the far-field zone of the ultrasonic transducer. Borehole fluid effects can negatively impact the technique. Casing inspection and cement bond evaluation requires two-way propagation of the ultrasonic signal through the borehole fluid with, preferably, minimal loss of diagnostic information. The nature/properties of the fluid in the borehole can significantly impact the propagation of ultrasonic signals. The intensity of sound wave decreases with distance travelled through the borehole fluid, owing mainly to the internal friction offered by the fluid or absorption of energy by the fluid. Therefore, logging in the far-field zone risks lowering the signal strength due to increased borehole fluid attenuation effects. Consequently, far field logging limits the operational envelope of tools to less attenuative fluids (e.g. low densities/solids load).

The decay rate of the signal amplitude as it propagates through the borehole fluid is termed as ultrasonic attenuation. In borehole materials with a linear elastic behavior, the acoustic pulse propagates in an idealized fashion and suffers only from ultrasonic attenuation losses. However, certain drilling and completion fluids are known to be dispersive, meaning that the received signal is often found to be attenuated and frequency shifted relative to the input signal. This is due to deviations of material behavior from a linearly elastic response. Specifically, different frequency components travel at different velocities in such fluids tending to distort and frequency shift the received waveform (dispersion), and the strength of the pulse will decrease with distance traveled (attenuation). Ultrasonic wave propagation is also influenced by the presence of microstructures/particles/solids in the fluid through which it propagates. The reflection of sound in directions other than its original direction of propagation is usually termed as scattering. The scattering can produce reduction in magnitude (attenuation) as well as spreading of the pulse. The larger the size of particles dissolved in the borehole fluid, the greater is the scattering of signal observed.

Logging in the far field also increases the sensitivity of the measurement to tool decentering and/or tilt. Maintaining adequate centralization of the ultrasonic tool inside the casing/borehole is critical for acquiring high quality data for casing inspection and cement evaluation. It is typically assumed that when the tool is properly centered and not tilted, the casing acts as flat reflector and the maximum amount of signal is returned. However, when the tool is de-centered, the casing does not behave as a flat reflector and signal is lost because the reflected signal is off axis and is not collected by the transducer. Another contributor to localized signal loss is non-normal angle of incidence because of head tilt. This issue is especially problematic when the tool must traverse through a section of casing that is deviated/curved or has a high dog leg severity. The main cause of head tilt is the tool remaining rigid while traversing the curved casing section. Logging in the far field zone of transducer worsens these mechanical problems. In the event of tool decentralization and tool tilt, the longer the standoff of the transducer from the casing, the higher the deviation of ultrasonic beam from the normal incidence.

Logging in the far field also exacerbates beam spreading effects. Flat ultrasonic transducers suffer from beam spreading effects. The pulse-echo signal amplitude from the on-axis reflector diminishes as $1/Z^2$ (here Z is the separation between the transducer and reflector surface, i.e., the inner surface of the casing). Consequently, logging at longer standoffs from the casing inner surface (i.e., far field zones) reduces signal levels and deteriorates the quality of logging measurements. Also, the spreading of the beam increases as the frequency of transducer decreases or the diameter of the active element (crystal) decreases. Hence, higher frequency transducers offer higher axial resolution compared to their lower frequency counterparts.

As described above, logging in the near field is contrary to standard and recommended industry practice. However, the inventors have found that an ultrasonic transducer that behaves like an array of emitters can be used to allow logging within the near field of the transducer. The transducer comprises a piezoelectric disc. According to some embodiments, the transducer may comprise modified lead metaniobate, such as K81 lead metaniobate. The transducer behaves as an array of point emitters, each of which emits ultrasonic pulse simultaneously when excited with an alternating input pulse. When in the receiving mode, the transducer behaves like a plane receiver. Planar geometry of the receiver has a wider collection angle compared to a point receiver and can acquire acoustic signal spread across a larger surface area, not just the signals along the axis normal to the transducer face center.

The array transducer can be generated from finishing a piezoelectric material during manufacture of the transducer. The transducer may have a non-zero surface roughness measurement and can be patterned with grinding, laser etching, mechanical etching or any other known method for generating surface features on crystalline materials. By treating the transducer as an array of emitters, then each individual emitter generates an acoustic wave pattern. The interference pattern of the individual result in a near planar wavefront at distances normally considered to be in the near field of an emitter with the traditional interpretation. The roughness of the piezo-ceramic crystal is found to have a strong influence on the conductance of the top electrode, as well as the distribution of emitted wavelets in the near field zone. According to some embodiments, the transducer's surface may have a roughness of about 1 to about 2 microns. Moreover, the conducting electrode on the crystal's front surface can be patterned to minimize the side-lobing effects of the acoustic beam. A vibrational crystal with patterned front electrode facilitates in minimizing the energy within the off-axis/non-normal emission direction of the acoustic pulse, and improving the axial resolution of the transducer. In terms of the detector response, the same surface area functions as a passive detector for received signals. When the transducer functions as a detector, the patterning has minimal effect because the surface integrates all the signal received into a single response profile.

Figure 6A:
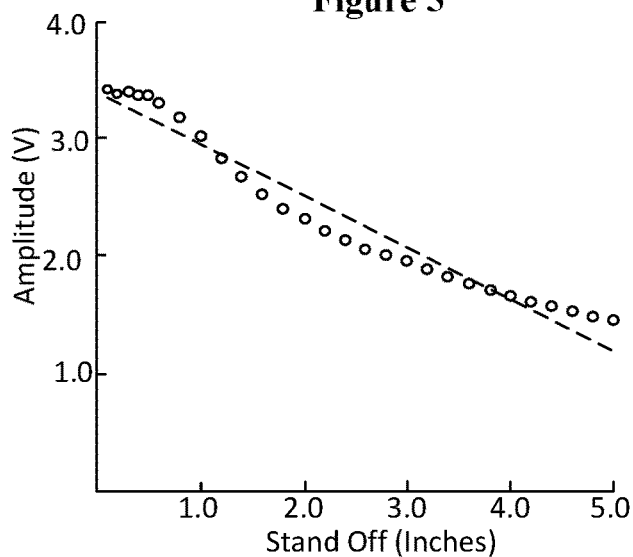
FIGS. 6A and 6B show measured (6A) and calculated (6B) amplitude of an ultrasonic wave as a function of distance from a transducer.
Figure 6B:
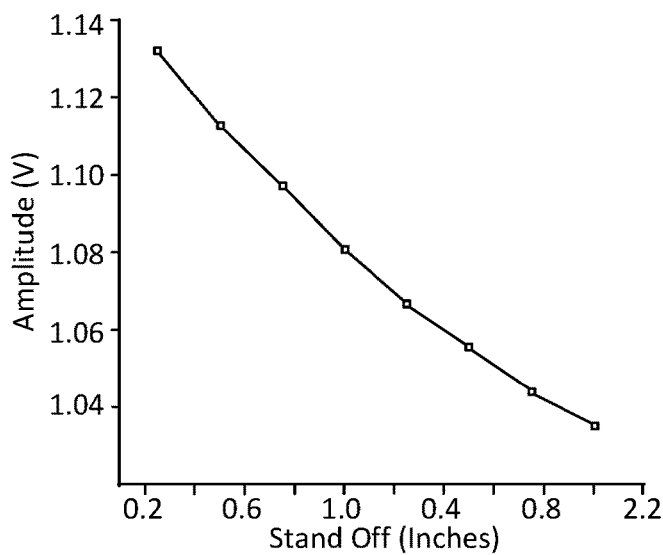

The transducer design allows ultrasonic logging in the near-field zone of the transducer. Logging in the near field minimizes the travel path of the ultrasonic signals, which improves the signal quality by significantly reducing the mud related attenuation, dispersion and scattering effects. Loss of signal amplitude because of tool decentralization and head tilt can also be significantly minimized by logging in the near field zone of the transducer. FIGS. 6A and 6B show measured and simulated signal amplitudes respectfully, for the presently described transducer as a function of standoff distance. Notice that in both graphs, the amplitude falls off exponentially as a function of standoff distance, which is attributed to spreading effect of the beam. The amplitude does not exhibit oscillatory behavior within the near field, as would be expected based on FIG. 5. Thus, the amplitude decay in the near field range is mostly predictable and does not cause harmful effects on amplitude based diagnostic measurement techniques. The overall distribution of acoustic fields in the near-field zone is observed to be similar for each transducer frequency employed by the tool for casing and cement evaluation.

A standard frequency transducer having a bandwidth of about 250 kHz to about 475 kHz in an oil-based mud with a slowness of about 238.1 μsec/ft has a far-field distance N of about 2.3 inches. A high frequency acoustic transducer having a bandwidth of about 350 kHz to about 625 kHz operating in a similar mud has a far-field distance N of about 3.1 inches. A low frequency acoustic transducer having a bandwidth of about 175 kHz to about 325 kHz, but operating in a similar mud has a far-field distance N of about 1.5 inches.

The inventors have found that the transducers described herein can be used with standoffs that configure the transducer well within the near-field. For example, the high-, medium-, and low-frequency transducers can each be used with standoffs of 1 inch, which is well within the near-field distance for each of those transducers. The high-frequency transducer can be used at a standoff that is 33% of the traditional far-field distance for that transducer. The medium-frequency transducer can be used at a standoff that is 50% of the traditional far-field distance for that transducer. Since acoustic attenuation is an exponential function of distance, being able to log at half, or one-third the distance traditionally considered viable provides a drastic improvement. According to some embodiments, the standoff distance may be 50% or less, 40% or less, 35% or less, or 33% or less of the traditional far-field distance (N).

Figure 7:
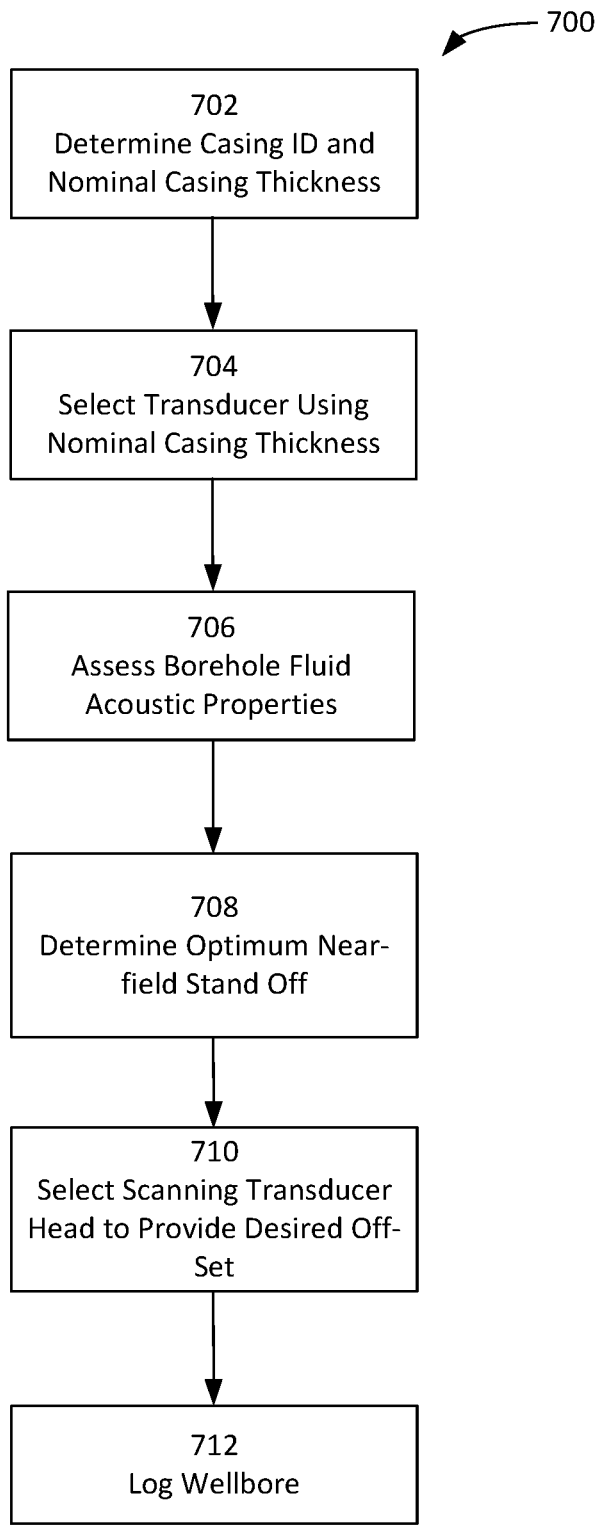
FIG. 7 shows a workflow of an exemplary method of ultrasonic logging.

FIG. 7 illustrates an example of a workflow 700 for near field ultrasonic logging of a cased wellbore. At step 702, the user may determine the thickness and the internal diameter of the casing of the wellbore. At step 704, the user may determine the best transducer type to be used based on the thickness resonant frequency of the casing. At step 706, assess the acoustic properties of the fluid filled inside the borehole in order to predict the attenuation effects on transducer signal. In case of fast borehole fluids like brine, logging in the far field zone of the transducer offers acceptable data, but logging in the near field zone is preferred for fluids slower and more attenuative than water. In other words, if the borehole fluid is a "fast" fluid, such as brine, then the user may choose to log in the far-field, as would traditionally be done. However, if the borehole fluid is a "slow" fluid, such as an oil-based mud that is expected to increase mud attenuation effects and complicate the logging, then the user may choose to log in the near-field. According to some embodiments, the decision of whether to log in the near-field may be based on the slowness of the borehole fluid. According to some embodiments, if the borehole fluid is slower than water, then the workflow may instruct the user to log in the near-field. According to some embodiments, if the borehole fluid has a slowness greater than about 200 μsec/ft, then the workflow may instruct the user to log in the near-field. In this example, assume that the user has determined to log in the near-field at step 706.

At step 708, determine the optimal near-field standoff based on the transducer head sizes that can be fitted in the underlying casing ID and offer a transducer signal that is below the acceptable attenuation limits. Thus, the exercise of determining optimum stand off for the detector is based on multiple parameters such as casing ID, transducer head size, the medium within the borehole (such as the drilling mud's weight and slowness), the mud attenuation effects, etc. As explained above, according to standard industry practice, if the calculated optimum standoff for a given system is less than the far field distance, then that optimum stand off would not be used because the industry standard practice is to avoid logging in the near field zone of the piezo-ceramic based transducer. However, according to this disclosure, optimum standoff distances within the near field may be employed. For example, as described above, far field distances may often range from about 1.5 inches for low weight, water-based muds and may range to 2.5 inches and higher for heavier oil-based muds. But according to embodiments of the disclosed methods and systems, standoff distances of less than 1.5 inches, about 1 inch, or less than 1 inch may be used.

At step 710, the user can select a scanning transducer head in accordance with the determined optimum standoff and which provides a standoff that is less than the far field distance for the transducer. At step 712, the tool equipped with the selected scanning transducer head is used to log the wellbore.

While the invention herein disclosed has been described in terms of specific embodiments and applications thereof, numerous modifications and variations could be made thereto by those skilled in the art without departing from the scope of the invention set forth in the claims.

What is claimed is:

1. A method of logging a wellbore containing a fluid and having a casing, the method comprising:
   providing an acoustic logging tool and a plurality of transducer heads, wherein:
      the acoustic logging tool is configured to use any of the transducer heads for acoustic logging,
      each of the transducer heads are configurable to use at least one transducer crystal,
      each of the transducer heads is configured to provide a different standoff distance between the transducer crystal and the casing when the acoustic logging tool is run into the wellbore,
   using one or more properties of the fluid to determine whether or not to use a standoff distance that is less than a far-field distance (N) from the casing for logging the wellbore,
   if it is determined to use a standoff distance that is less than (N), selecting a transducer head to provide a standoff distance that is less than (N),
   else, selecting a transducer head to provide a standoff distance that is equal to, or greater than (N),
   configuring the acoustic logging tool with the selected transducer head, and
   logging the wellbore with the acoustic logging tool.

2. The method of claim 1, wherein the far-field distance (N) is determined by the equation:

$$N = \frac{D^2}{4\lambda} = \frac{D^2 f}{4v},$$

where D is the diameter of the transducer crystal, $\lambda$ is a wavelength of an ultrasonic signal emitted by the transducer crystal, f is a frequency of the ultrasonic signal emitted by the transducer crystal, and v is a velocity of the ultrasonic signal in a medium contained within the wellbore.

3. The method of claim 1, wherein each of the transducer heads are configurable to accept interchangeable transducers crystal, wherein each interchangeable transducer crystal has a different transducer resonance frequency bandwidth.

4. The method of claim 3, further comprising:
determining a nominal thickness of the casing,
using the nominal thickness of the casing to determine a resonance frequency of the casing, and
using the resonance frequency of the casing to select an interchangeable transducer crystal such that the resonance frequency of the casing is within the frequency bandwidth of the selected interchangeable transducer crystal.

5. The method of claim 4, further comprising using the frequency bandwidth of the selected interchangeable transducer crystal to determine a far-field distance (N) for the selected transducer.

6. The method of claim 4, wherein the selected interchangeable transducer crystal has a surface roughness of about 1 to about 2 μm.

7. The method of claim 1, wherein using one or more properties of the fluid to determine whether or not to use a standoff distance that is less than a far-field distance (N) comprises:
determining if the fluid has an acoustic slowness greater than that of water,
if so, using a standoff that is less than N,
else, using a standoff that is equal to, or greater than N.

8. The method of claim 1, wherein using one or more properties of the fluid to determine whether or not to use a standoff distance that is less than a far-field distance (N) comprises:
determining if the fluid has an acoustic slowness greater than 200 μsec/ft,
if so, using a standoff that is less than N,
else, using a standoff that is equal to, or greater than N.

9. The method of claim 1, wherein it is determined to use a standoff distance that is less than (N), and wherein the standoff is 50% or less of (N).

10. The method of claim 1, wherein it is determined to use a standoff distance that is less than (N), and wherein the standoff is 33% or less of (N).

11. The method of claim 1, wherein the transducer crystal transmits acoustic energy within a bandwidth of about 250 k, and wherein the standoff distance is 1.5 inch or less.

12. The method of claim 1, wherein the transducer crystal transmits acoustic energy within a bandwidth of 350 k, and wherein the standoff distance is 1.5 inch or less.

13. The method of claim 1, wherein the transducer crystal transmits acoustic energy within a bandwidth of 175 k, and wherein the standoff distance is 1.5 inch or less.

14. A method of logging a wellbore containing a fluid and having a casing, the method comprising:
providing an acoustic logging tool and a plurality of transducer heads, wherein:
the acoustic logging tool is configured to use any of the transducer heads for acoustic logging,
each of the transducer heads are configurable to use at least one of a plurality of interchangeable transducer crystals, wherein each of the interchangeable transducer crystals has a different transducer resonance frequency bandwidth,
each of the transducer heads is configured to provide a different standoff distance between the transducer crystal and the casing when the acoustic logging tool is run into the wellbore,
using a nominal thickness of the casing to select one of the interchangeable transducer crystals,
using an internal diameter of the casing to select a transducer head, such that the standoff distance is less than a far-field distance (N) from the casing
configuring the acoustic logging tool with the selected transducer head, and
logging the wellbore with the acoustic logging tool.

15. The method of claim 14, wherein the far-field distance (N) is determined by the equation:

$$N = \frac{D^2}{4\lambda} = \frac{D^2 f}{4v},$$

where D is the diameter of the transducer crystal, $\lambda$ is a wavelength of an ultrasonic signal emitted by the transducer crystal, f is a frequency of the ultrasonic signal emitted by the transducer crystal, and v is a velocity of the ultrasonic signal in a medium contained within the wellbore.

16. The method of claim 14, wherein the selected interchangeable transducer crystal has a surface roughness of about 1 to about 2 μm.

17. The method of claim 14, wherein it is determined to use a standoff distance that is less than (N), and wherein the standoff is 50% or less of (N).

18. The method of claim 14, wherein it is determined to use a standoff distance that is less than (N), and wherein the standoff is 33% or less of (N).

* * * * *